United States Patent [19]

Stillhard

[11] 4,384,241

[45] May 17, 1983

[54] SEWING MACHINE DRIVE

[75] Inventor: Otmar Stillhard, Steckborn, Switzerland

[73] Assignee: Fritz Gegauf Aktiengesellschaft Bernina-Nachmaschinenfabrik, Steckborn, Switzerland

[21] Appl. No.: 198,241

[22] Filed: Oct. 17, 1980

[30] Foreign Application Priority Data

Oct. 19, 1979 [CH] Switzerland ............... 9407/79

[51] Int. Cl.³ ............................... H02P 5/06
[52] U.S. Cl. ............... 318/317; 318/331; 318/345 R
[58] Field of Search ............. 318/305, 317, 329, 331, 318/341, 345 R, 345 A, 345 CA, 434

[56] References Cited

U.S. PATENT DOCUMENTS

| 4,151,450 | 4/1979 | Fukuma et al. | 318/317 |
| 4,152,632 | 5/1979 | Peterson | 318/317 |
| 4,182,979 | 1/1980 | Douglas et al. | 318/434 |
| 4,299,182 | 11/1981 | Tanaka | 318/305 X |

FOREIGN PATENT DOCUMENTS

| 45993 | 12/1968 | Fed. Rep. of Germany . |
| 2851814 | 6/1979 | Fed. Rep. of Germany . |
| 2750782 | 1/1981 | Fed. Rep. of Germany . |
| 2934316 | 2/1981 | Fed. Rep. of Germany . |
| 5513673 | 7/1978 | Japan | 318/317 |
| 1039785 | 8/1966 | United Kingdom . |
| 1152811 | 5/1969 | United Kingdom . |
| 1255382 | 12/1971 | United Kingdom . |
| 1574164 | 9/1980 | United Kingdom . |

OTHER PUBLICATIONS

IBM Disc. Bulletin, vol. 8, No. 12, May, 1966, pp. 1767–1768—by V. C. Martin—Dual Speed Motor.
Lütjens, "Schaltregler mit hochspannungsfestern Transistor für Permanentmagnet-Motoren," Elektronik, vol. 26, No. 5, 1977; pp. 73–78.

Primary Examiner—J. V. Truhe
Assistant Examiner—Richard M. Moose
Attorney, Agent, or Firm—Wender, Murase & White

[57] ABSTRACT

A sewing machine drive having a mains rectifier (1) which, via a chopper (2) operating at a relatively high frequency, supplies direct current pulses to the driving motor (3). The duty ratio of these driving pulses is controlled as a function of a nominal value transmitter (11) and a current limiting circuit (14) controlled by the motor speed. This produces a smooth quiet, vibration-free operation of the motor (3) or the driven machine with a high degree of motor efficiency. Moreover, a speed-dependent current limitation occurs in such a manner that at high speeds a limited maximum current flows, which at the same time results in an output limitation.

7 Claims, 5 Drawing Figures

SEWING MACHINE DRIVE

The present invention relates to a sewing machine drive for connection to an a.c. power supply, and having a current limiting circuit.

Drives for sewing machines and similar apparatus usually include a driving motor which is energized via a controllable thyristor. The thyristor in such a case is typically controlled by a foot pedal which includes a potentiometer.

In the current intervals the EMF induced in the motor may be measured and utilised to maintain the motor speed substantially constant for a given position of the control potentiometer as disclosed in German Offenlegungsschrift No. 28 51 814.

Such a drive, in which the driving motor is supplied with pulses from the mains frequency, has a relatively low degree of efficiency, however, and pulse noises often occur which become unpleasantly noticeable in sewing machines.

It is also known to provide motor drives having an electronic control circuit further including a current limiting circuit, according to the publication Elektronik (Vol. 5, 1977). The current limiting circuit, however, also serves the purpose of protecting the output transistor or thyristor from damage due to high current peaks.

The object of the present invention is to provide a materially means of current limitation and thereby obtain considerable advantage in sewing machine drives.

According to the present invention there is provided a sewing machine drive for connection to an a.c. power supply having a current limiting circuit for a drive motor, in which the current limiting circuit is controllable by a value proportional to the motor current, such that the motor output is limited at all speeds to at least substantially the same value.

Hence there is obtained a speed-dependent current limitation with a relatively low limiting current at high speed and a high limiting current at low speed or when blocking the machine, whereby the output absorption of the drive is limited and overload prevented. For a sewing machine drive it is particularly critical at low speed to have a high driving torque at your disposal, so as to ensure reliable piercing of the needle. The circuit of the drive may preferably comprise a mains rectifier for direct current supply, chopper connected between the rectifier and the direct current driving motor, an oscillator for controlling the chopper at a frequency far above the mains frequency and a control circuit responsive to the motor speed for controlling the motor current by modulation of the pulse period of the chopper. Due to the high operating frequency which, for example, may be 15 kHz, the motor current is substantially smoothed off by the rotor inductance and no disturbing vibrations and noises occur in the drive and in the machine. Therefore the motor operates with great efficiency, while in the rectifier and the chopper, only very low losses occur. Hence, current limitation in accordance with the invention, which amounts to a performance control, is possible to a maxmum extent.

The present invention will be described further, by way of example, with reference to the accompanying drawings, in which.

Figure 1:
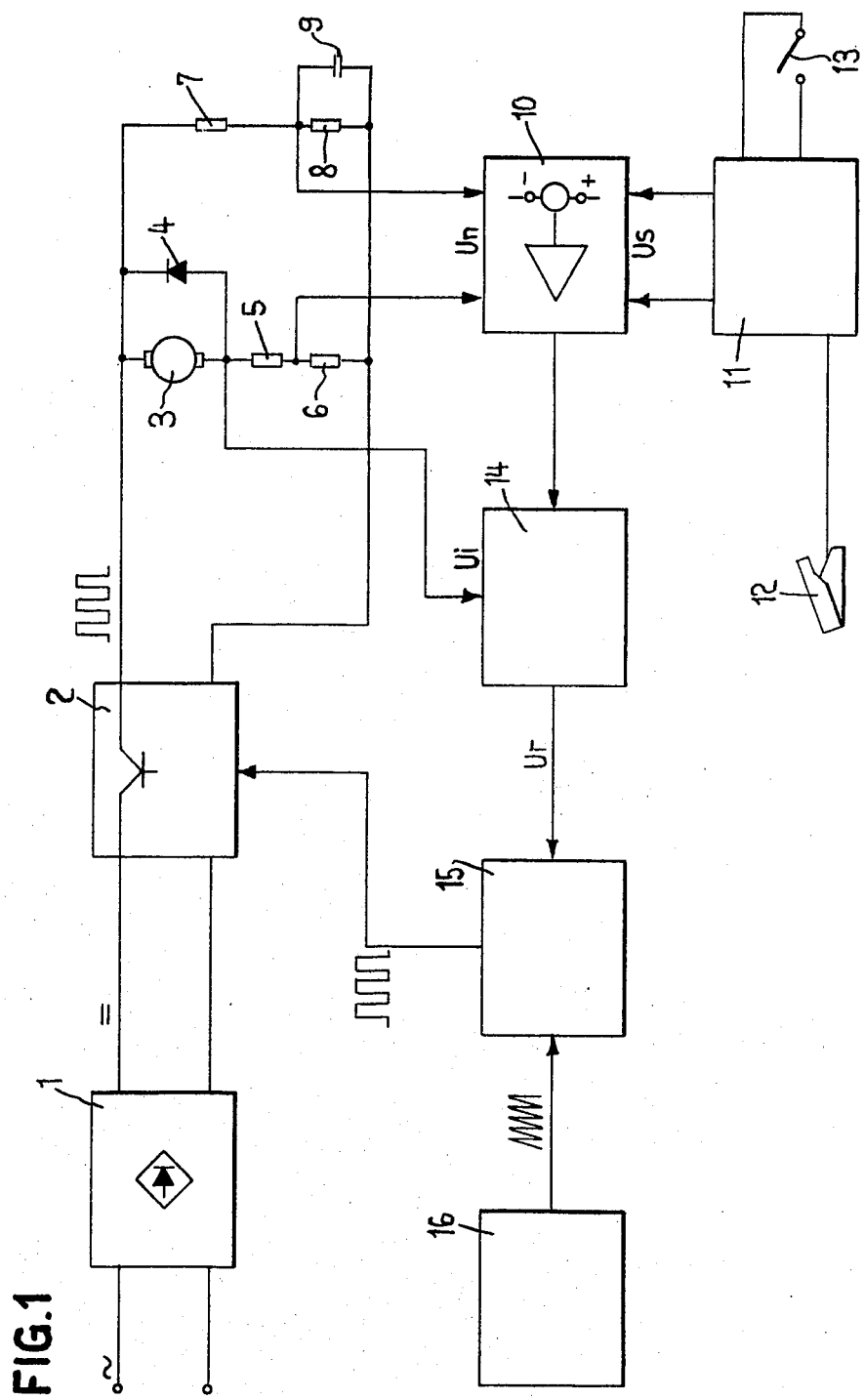
FIG. 1 shows a block diagram of a drive control circuit for a sewing machine according to the present invention.

In accordance with FIG. 1 the drive control circuit has a rectifier 1 for connection to an a.c. power supply. The smoothed direct voltage of the rectifier is supplied to a chopper 2, the switching transistor of which is shown schematically. The pulsed direct voltage is supplied from the output of the chopper 2 to the driving motor 3 which has a diode 4 connected in parallel thereto. The motor current flows via two series connected resistors 5 and 6, and these series-connected resistors 5 and 6 have resistors 7 and 8 connected bridge-like in parallel therewith, the resistor 8 also having a capacitor 9 connected in parallel therewith for smoothing the voltage. The circuit associated with the motor 3, comprising of the resistors 6 through 8, is known per se and supplies a voltage Un substantially proportional to the motor speed, independent of the loading of the motor or the motor current. A condition of this arrangement is the use of a direct current motor having a permanent field.

The voltage Un corresponding to the motor speed is supplied to a control amplifier 10, which is also supplied with a nominal value voltage Us. This nominal value voltage is produced in a nominal value circuit 11 in dependence upon the position of a foot control 12 having a control potentiometer. Moreover, a switch 13 is provided with which two control regions, e.g. two speed ranges may be preselected. The output voltage of the control amplifier 10 arrives at the input of a current limiting circuit 14, which at a further input receives the voltage drop across the resistors 5 and 6 i.e., as a voltage Ui proportional to the motor current supplied thereto. At the output of the current limiting circuit 14 a control voltage Ur appears which is supplied to a pulse modulator 15. This pulse modulator 15 produces rectangular output pulses from a saw-tooth voltage of, for example, 15 kHz supplied from an oscillator 16. The duty ratio of the constant frequency pulse delivered by chopper 2 is modulated according to the control voltage Ur so that the final motor current is substantially proportional to the given pulse period. The control of the motor is effected in this manner.

Figure 2:
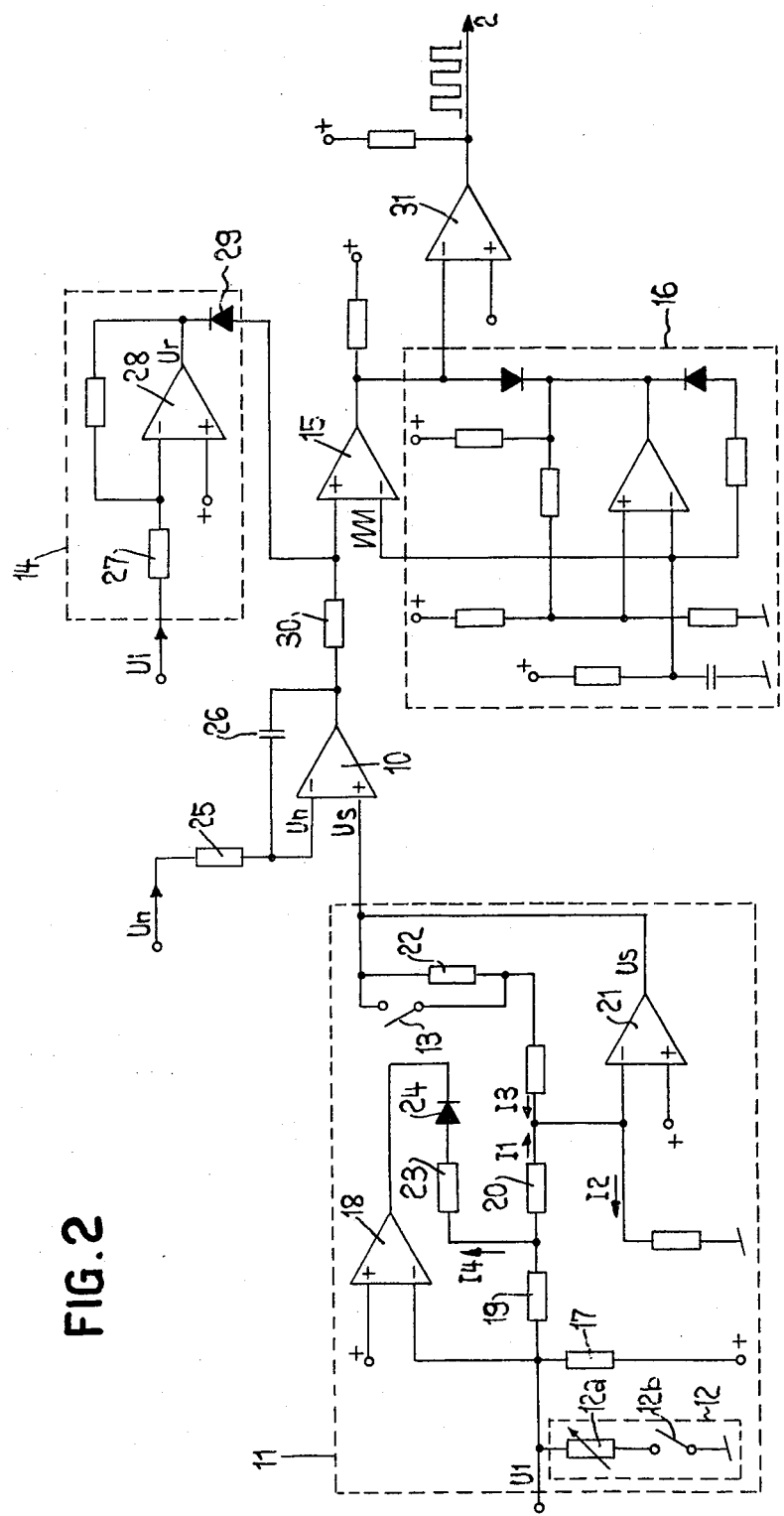
FIG. 2 shows details of certain circuit components of the device of FIG. 1.

In FIG. 2 corresponding parts are identically designated as in FIG. 1. The foot control 12 has a potentiometer 12a and a limit switch 12b. This controller 12 is supplied via a resistor 17 from a positive current source, and the voltage appearing at the control potentiometer 12a arrives at the input of an amplifier 18, the other input of which is constantly connected to positive voltage. The control potentiometer 12a moreover is connected via resistors 19 and 20 to one input of an amplifier 21, in the feedback circuit of which the selector switch 13 for a resistor 22 is parallel connected. The connection between the resistors 19 and 20 is connected via a further resistor 23 and a diode 24 to the output of the amplifier 18. The output of the amplifier 21 is connected to one input of the control amplifier 10, the other input of which is supplied via a resistor 25 with the speed-dependent voltage Un. the control amplifier 10 is provided with a feedback capacitor 26 as integrator controller. The voltage Ui proportional to the motor current arrives via a resistor 27 at the input of an amplifier 28 of the current limiting circuit 14, the other input of which is connected to a constant positive voltage. The output of the amplifier 28, or the current limiting circuit 14, is connected via a diode 29 to the input of the pulse modulator 15 which is another amplifier. This input is also connected, via a resistor 30, to the output of the control amplifier 10. The amplifier 15 is connected, in the manner shown, to the saw-tooth oscillator 16, the circuit and method of operation of which is not described in detail. The output of the amplifier 15, or pulse modulator, is connected via an amplifier 31 to the input of the chopper 2.

By means of FIG. 2 the preparation of the nominal voltage Us will first be described. During operation, the switch 12b of the foot control 12 is closed and the potentiometer 12a forma a voltage divider with the resistor 17. The voltage U1, via the potentiometer 12a thus fluctuates, for example, between 0 and 6.5 volts, when the potentiometer is moved from one end position to the other. This voltage causes a current I1 via the resistors 19 and 20. Since due to the connection of the operational amplifier 21 the current I2 is constant, with a decrease of current I1, the current I3 and thus the output voltage Us increases. The circuit is thus so arranged that with a maximum resistance of the potentiometer 12a, the current I3 is practically 0. Hence the output voltage Us hardly changes when, by way of the switch 13, the resistor 22 is short-circuited and hence the amplification of the operational amplifier 21 is reduced in this operational point. This reduction in a sewing machine corresponds to a reduction of the maximum number of stitches per minute with an only slightly reduced initial number of stitches. It is necessary to keep within a minimum number of stitches to ensure satisfactory loop formation in the gripper system of the sewing machine.

The voltage divider, comprised of resistors 17 and 12a is so arranged that, with a linear reduction of the potentiometer 12a, a progressively growing output voltage Us results. On release of the pedal 12 the switch 12b is open, in which case the voltage U1 rises to about 10.5 volts, and the output voltage Us would become very small due to the increased current I1. The amplifier 18, however, switches its output to 0 and reduces the current I1 again by the current I4. Thus it is possible to achieve a result that the nominal voltage Us, even with the switch 12b switched off, still corresponds to the initial speed. In sewing machines with needle positioning after the foot starter has been released a nominal value has to be made ready during the positioning operation.

Figure 3:
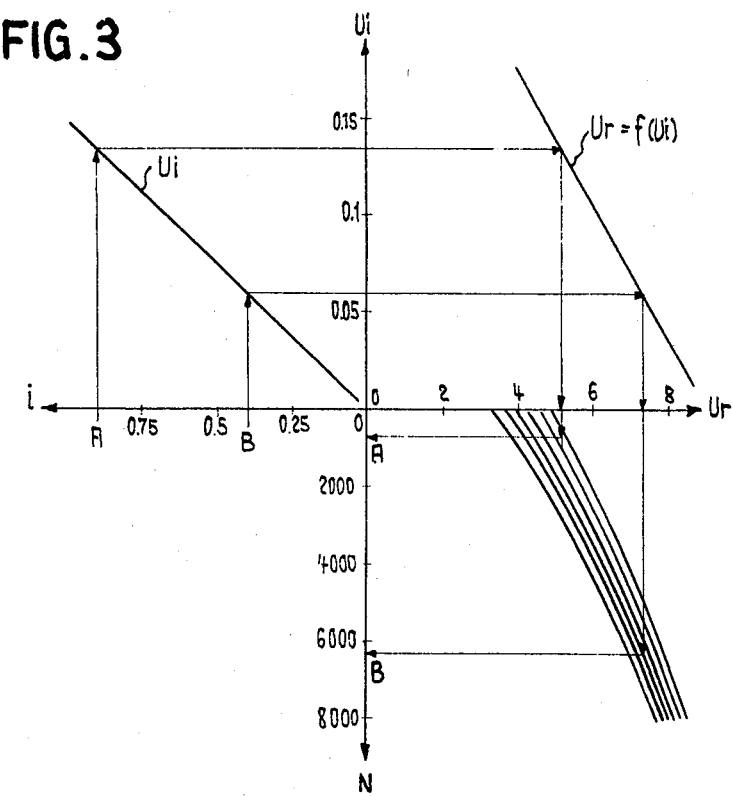
FIGS. 3 to 5 are diagrams illustrating the method of operation of the drive control circuit of FIG. 1.

The current limitation by the circuit 14 is described by way of the diagram in FIG. 3. At the output of the amplifier 28 a voltage U1 appears which is proportional to the input voltage Ui. Via the diode 29 this output voltage limits the control voltage occurring maximally at the input of the amplifier 15, i.e. this control voltage in the example shown may be higher at the most by 0.7 volts than the output voltage at the amplifier 28. FIG. 3 shows the maximum speed Nmax for various motor currents i, whereby this speed is a function of the current and the limiting voltage Ui. When loading the motor, i.e. with an increase of the motor current the control voltage is limited to a maximum value, and hence also the speed is limited. In FIG. 3 two examples A and B are illustrated showing that with a high motor current the speed is limited to a lower value and with a low motor current it is limited to a higher value.

Figure 4:
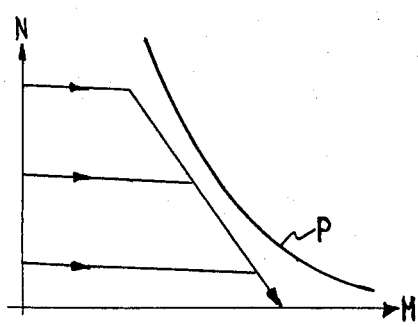

FIG. 4 shows the corresponding graph of the motor characteristics, in which up to limitation of the current, the speed N is practically constant for all turning torques M and then drops relatively steeply owing to the current limitation. This path of the characteristics corresponds substantially to that of the output hyperbola P, i.e, the motor output is kept substantially constant for all speeds.

Figure 5:
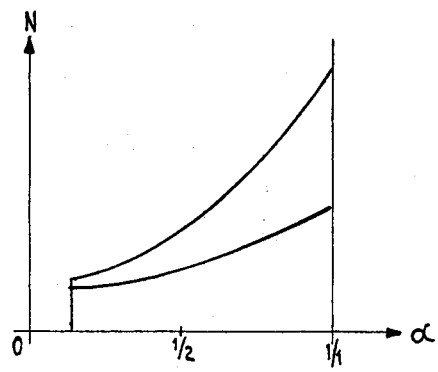

FIG. 5 shows the course of the speeds for both selectable speed ranges as function of the angle of depression of the pedal 12. As shown by this diagram, the initial speeds are substantially identical and at higher speeds the difference between the first and second stage more distinctive.

The current limitation described is not only favourable for limiting the output and hence permitting a relatively small dimensioning of the rectifier and the chopper, but at low speeds higher torques are available. This is of particular significance in operating machines having a highly variable torque requirement, for example, in sewing machines wherein with lower speeds there is a risk that the needle will not pierce the material being sewn. This risk is removed or substantially reduced by the high available torque at low speeds.

I claim:

1. A sewing machine drive for connection to an a.c. power supply, comprising:
   a d.c. motor;
   a rectifier coupled to the a.c. power supply and delivering a d.c. voltage for said motor;
   a chopper connected to said motor and receiving said d.c. voltage, said chopper being controlled by a pulse modulator which is connected to an oscillator and to a control circuit delivering a control voltage for adjusting the duty ratio of pulses produced by said pulse modulator in dependence upon the speed of said motor so as to maintain said speed of said motor substantially constant; and
   a current limiting circuit connected to said pulse modulator and controlled by a voltage proportional to current in said motor for limiting said control voltage to a maximum value, said value being continuously variable in proportion to said current in said motor, any further increase of said motor current above a predetermined value resulting in a decrease in said speed of said motor such that motor output power is substantially constant for all motor speeds.

2. A drive according to claim 1, wherein said current limiting circuit comprises an amplifier receiving as an input voltage said voltage proportional to current in said motor, and delivering an output voltage which varies inversely proportional to said input voltage, said output voltage of said amplifier being connected through a diode to said pulse modulator so that said control voltage delivered to said pulse modulator cannot exceed said output voltage augmented by a conduction voltage of said diode.

3. A drive according to claim 1, wherein said oscillator delivers a signal having a frequency greater than the frequency of the a.c. power supply.

4. A drive according to claim 1, wherein said control circuit is an amplifier connected to a sensor delivering a voltage proportional to speed of said motor and to a nominal value circuit delivering a nominal value voltage in dependence upon the position of a foot control having a potentiometer in series with a limit switch which is open when a pedal of the foot control is released, said amplifier being connected as an integrator controller.

5. A drive according to claim 4, wherein said nominal value circuit comprises a switch for selecting at least two speed ranges.

6. A drive according to claim 5, wherein said nominal value circuit comprises a first amplifier delivering said nominal value voltage in dependence upon the position of said control potentiometer, said switch for selecting at least two speed ranges acting in a feedback circuit of said first amplifier for determining gain of said first amplifier, such that for a maximum resistance of said potentiometer said nominal value voltage hardly changes when said switch is actuated for reducing the gain of said first amplifier which results in a reduction of the maximum number of stitches per minute of the machine with an only slightly reduced initial number of stitches.

7. A drive according to claim 6, said nominal value circuit further comprising a second amplifier having an input connected to said foot control and an output connected to said feedback circuit of said first amplifier, such that when said limit switch is open said nominal value voltage still corresponds to said initial number of stitches.

* * * * *